US009129335B1

(12) United States Patent
Norwood et al.

(10) Patent No.: US 9,129,335 B1
(45) Date of Patent: Sep. 8, 2015

(54) LOCALIZATION OF MERCHANT DATA

(75) Inventors: Jonathan B. Norwood, Seattle, WA (US); Erik Schmitz, Veldenz (DE); Alex Sinner, Bissen (LU); Dimitri Paul Hoffman, Diekirch (LU); Raquel Gonzalez-Dalmau, Luxembourg (LU); Jaime Silvela, Luxembourg (LU); David D. Glick, Seattle, WA (US); Volker Metten, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 454 days.

(21) Appl. No.: 13/245,457

(22) Filed: Sep. 26, 2011

(51) Int. Cl.
*G06Q 30/00* (2012.01)
*G06Q 30/06* (2012.01)
*G06Q 30/02* (2012.01)
*G06Q 20/32* (2012.01)
G06Q 20/12 (2012.01)
G06Q 10/08 (2012.01)
H04L 29/06 (2006.01)

(52) U.S. Cl.
CPC ........ *G06Q 30/0641* (2013.01); *G06Q 20/3224* (2013.01); *G06Q 30/0253* (2013.01); *G06Q 30/06* (2013.01); *G06Q 30/0601* (2013.01); G06Q 10/087 (2013.01); G06Q 20/12 (2013.01); H04L 63/107 (2013.01)

(58) Field of Classification Search
CPC ... G06Q 30/00; G06Q 30/02; G06Q 30/0253; G06Q 30/06; G06Q 30/0601; G06Q 30/0613; G06Q 30/0623; G06Q 30/0621; G06Q 30/0633; G06Q 30/0641; G06Q 10/087; G06Q 20/3224; G06Q 20/12; H04L 63/107
USPC .......... 705/26.1, 27.1, 14.51, 26.61, 26.8, 28, 705/26.41; 707/E17.109, 999.004, 99.103, 707/999.104; 455/456.1
See application file for complete search history.

(56) References Cited

U.S. PATENT DOCUMENTS

| 7,013,289 B2 * | 3/2006 | Horn et al. ................. 705/14.51 |
| 2002/0054097 A1 * | 5/2002 | Hetherington et al. ........ 345/762 |
| 2006/0277286 A1 * | 12/2006 | Zhang et al. .................. 709/223 |
| 2007/0112635 A1 * | 5/2007 | Loncaric ......................... 705/26 |
| 2009/0037830 A1 * | 2/2009 | Kulkarni et al. .............. 715/764 |
| 2009/0171802 A1 * | 7/2009 | Raygoza ......................... 705/26 |
| 2012/0109786 A1 * | 5/2012 | Platek .......................... 705/27.1 |

OTHER PUBLICATIONS

Press report, "Traction Software Enters German Market and Provides German Localization for Industry's First Enterprise Weblog" published in Business Wire [New York] Jun. 1, 2004: 1 and extracted from Proquest Dialog on Apr. 20, 2014.*

* cited by examiner

*Primary Examiner* — Yogesh C Garg
(74) *Attorney, Agent, or Firm* — Thomas | Horstemeyer, LLC

(57) ABSTRACT

Disclosed are various embodiments for localization of merchant data. A computing device provides at least one localization option to a merchant, where the localization option relates to an offer listing associated with an item. A localization request is obtained from the merchant relating to the offer listing, and the content contained in the offer listing is parsed. Based at least in part on the localization request, the content is translated to generate a localized offer listing.

21 Claims, 5 Drawing Sheets

LOCALIZATION OF MERCHANT DATA

BACKGROUND

Merchants who participate in an electronic marketplace are often focused on the performance of their virtual store and are interested in targeting customers in different geographic areas. Localization refers to the process of adapting content for a specific locale, such as, for example, a particular region or language by adding locale-specific components or translating text. Third party merchants face increasing localization issues as increasing global business leads to users who are more geographically diverse. Such third party merchants may utilize offer listings to offer a wide range of items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to localization of offer listings and specifically, to localization of merchant data contained in offer listings. Offer listings containing merchant data may often be provided in multiple languages. Content included within the offer listings of a network site sometimes may be provided in multiple languages. Generally, offer listings are utilized by merchants to offer items or products for sale to customers, for example, through an online catalog embodied as one or more network sites or other means. However, the network site may be associated with a locale, such as a particular country, geographic area, or language. A non-limiting example of a locale-specific network site may involve, for example, the use of British English versus American English for content within the network site. Translations of a particular content item into a language may differ based upon the locale.

When managing multiple network sites associated with different locales, it may be impractical to maintain a separate localized translation for each locale. One approach to localization of offer listings containing merchant data may include pre-translating merchant data for pre-determined locales. However, this may be inefficient from the standpoint of translation resources since the locales being targeted by a merchant may constantly change. In the following discussion, a general description of the system and its components is provided, followed by a discussion of the operation of the same.

Figure 1:
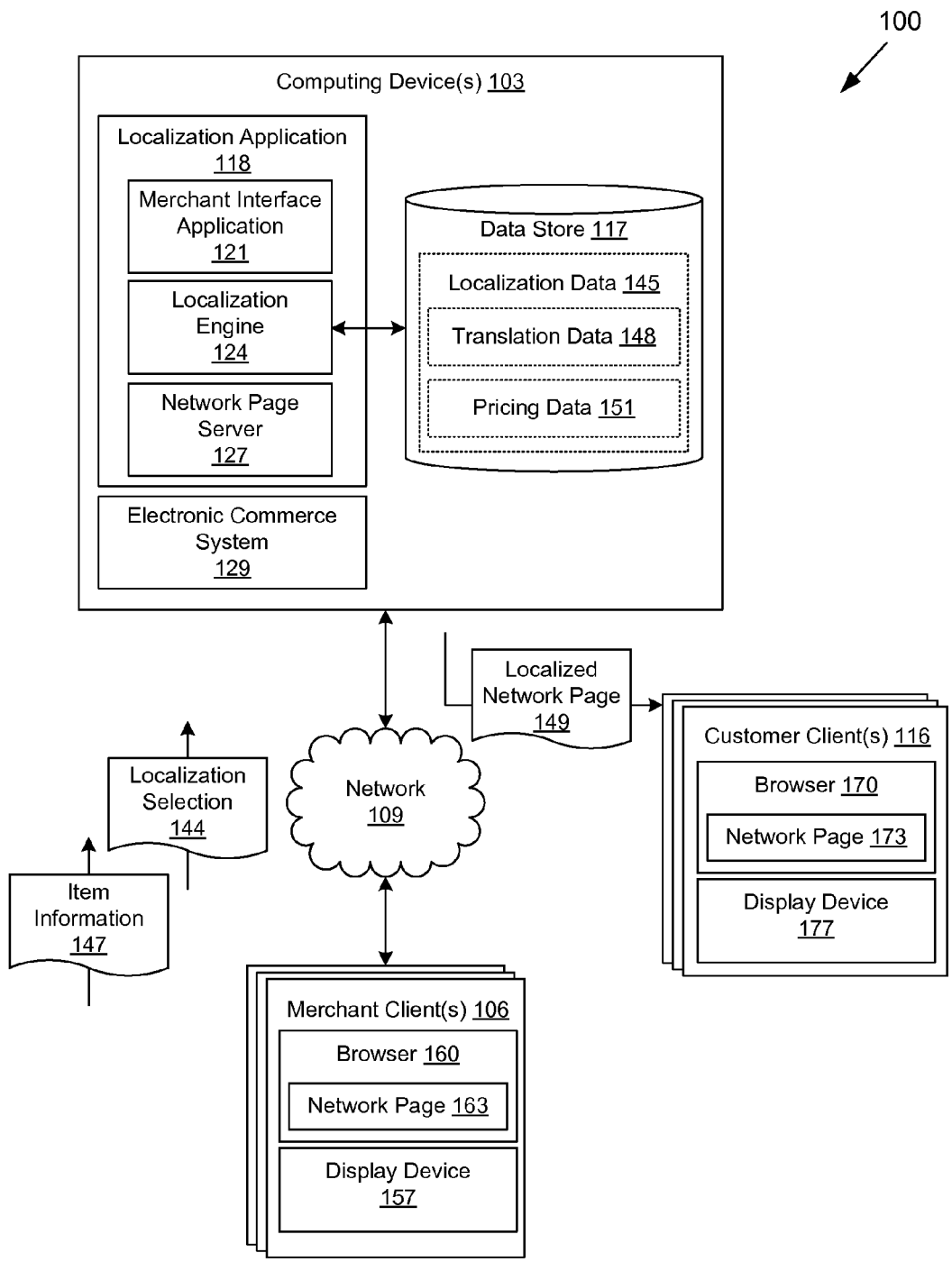
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more merchant clients 106 by way of a network 109. The networked environment 100 also includes one or more customer clients 116 in data communication with the one or more merchant clients 106 and the computing devices 103 by way of the network 109. The network 109 includes, for example, the Internet, intranets, extranets, wide area networks (WANs), local area networks (LANs), wired networks, wireless networks, or other suitable networks, etc., or any combination of two or more such networks.

Each computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. However, even though each computing device 103 is referred to in the singular, it is understood that a plurality of computing devices 103 may be employed in the various arrangements as described above.

Various applications and/or other functionality may be executed in the computing device 103 according to various embodiments. Also, various data is stored in a corresponding data store 117 that is accessible to the computing device 103. The data store 117 may be representative of a plurality of data stores as can be appreciated. The data stored in the data store 117, for example, is associated with the operation of the various applications and/or functional entities described below.

The components executed on the computing device 103, for example, include a localization application 118 configured to localize one or more offer listings specified by the merchant client 106. The localization application 118 includes, for example, a merchant interface application 121, a localization engine 124, and a network page server 127 in addition to other applications, services, processes, systems, engines, or functionality not discussed in detail herein. For some embodiments, the merchant interface application 121 obtains a specification of locale(s) where items are to be offered from the merchant client 106. The specification of locale(s) may relate to localization of one or more offer listings that may include one or more items associated with an electronic commerce site. An item may refer to a product, good, service, software download, multimedia download, social networking profile, or any combination, bundle, or package thereof, that may be offered for sale, purchase, rental, lease, download, and/or any other form of consumption as may be appreciated. The merchant interface application 121 is executed to generate one or more network pages incorporating a user interface. The network page server 127 may be configured to receive the network pages generated by the merchant interface application 121 and serve up the network pages to one or more merchant clients 106. Note that for various embodiments, the components shown in the computing device 103 may be implemented in the same computing device 103 or distributed across a plurality of computing devices 103.

The localization engine 124 performs the localization of the content contained in one or more offer listings specified by the merchant client 106 using the user interface generated by the merchant interface application 121. Localization of the content is performed using the information obtained by the merchant interface application 121, wherein the localization engine 124 may generate one or more localized offer listings. The network page server 127 serves up the localized offer listings to one or more customer clients 116 in the form of localized network pages or other forms of network content, where the localized offer listings have been translated into one or more languages based at least in part on the locale preferred by one or more users of the customer client 116. Other content in the localized offer listings such as, for example, pricing information, is also localized according to selections made by the merchant client 106.

In this regard, the localized offer listings served up by the network page server 127 may correspond to offer listings that are generated by a network-based application in some embodiments. The offer listings may include such localized elements as a translated item listing, pricing information specific to one or more locales, and so on where the particular locales may be associated with users of the customer client(s) 116. An electronic commerce system 129 in the computing device 103 performs various backend functions associated with the online presence of a merchant to facilitate the online purchase of items. For example, the electronic commerce system 129 may facilitate the selection of items for purchase, rental, download, lease, or other forms of consumption and where fulfillment is performed through a fulfillment network.

The merchant interface application 121 is in data communication with merchant clients 106 and receives such data as a localization selection 144 and item information 147. For some embodiments, the merchant interface application 121 generates a user interface embodied as a network page, for example, where the user interface is utilized to retrieve information from the merchant client 106. The user interface may be customized according to the merchant associated with the merchant client 106. For example, the merchant interface application 121 may provide a list of locales that the merchant can select from for localizing content, where the list of locales may be generated based at least in part on the geographical area(s) serviced by a material handling facility such as a fulfillment center or other facility operated by the merchant. Inventory described by a purchase order may then be readily shipped to the fulfillment center and later sent to the customer such that shipping costs to customers are minimized. In this regard, the merchant interface application 121 may have access to a listing of the locales in which one or more fulfillment centers of the merchant are located.

A localization selection 144 obtained by the merchant interface application 121 may include, for example, a selection of one or more locales in which target offer listings associated with the merchant client 106 are to be translated and localized for customers in the selected locales. The item information 147 retrieved by the merchant interface application 121 from the merchant client 106 includes such information as a specific item(s) and a stock keeping unit (SKU) or other identifier associated with a merchant, where the merchant SKU identifies particular inventory from which transactions are to be fulfilled. The merchant SKU may be associated, for example, with inventory in a particular location. The item information 147 also includes pricing information relating to the specified item(s).

Electronic marketplaces are often associated with a particular country, and the products are typically priced using the currency associated with the country. However, as different currencies exist, merchants may have to manually convert a first price in their preferred currency to a second price in the currency used in the electronic marketplace. In accordance with some embodiments, the merchant interface application 121 is configured to adjust pricing of items in foreign marketplaces to account for fluctuations in currency exchange rates as a merchant may have a specific return in mind when listing an item for sale in a foreign electronic marketplace. Additional details on adjusting prices of items in foreign marketplaces are described in U.S. patent application Ser. No. 13/027,933 entitled "PRICING FOR FOREIGN MARKETPLACES," which was filed on Feb. 15, 2011 and is incorporated herein by reference in its entirety.

The item information 147 may specify an existing offer listing containing item information 147 or may be presented in a feed-style format, where each item feed includes information about one or more items. In this regard, the merchant may specify one item at a time for localization or may specify a large volume of items via an item feed, which the localization engine 124 processes and localizes according to one or more locales selected by the merchant client 106.

The localization engine 124 performs localization of one or more offer listings associated with the merchant client 106. Localization of an offer listing(s) may include not only translation of description(s) relating to the item(s) but also reclassification of the item(s) based at least in part on the locale selected by the merchant client 106. As a non-limiting example, the item description "customer electronics photography, digital camera" contained in an offer listing targeting customers in the United States may be reclassified as "customer electronics, digital camera, DSLR" in Germany where the item description in the offer listing targeting that locale is translated into German.

Upon receiving content to localize, the localization engine 124 parses the content contained in the item information 147. Referring back to the non-limiting example above, the localization engine 124 may parse an item description such that the terms "customer electronics" are grouped together rather than separated. Upon parsing the content, the localization engine 124 accesses the data store 117 to determine whether translation data 148 relating to at least a portion of the content is already available so that translation of that portion may be bypassed.

To this end, the localization engine 124 is configured to parse the content to identify content items capable of generic translation versus content items that may require translation by translation professionals. Additional details on how to distinguish between content items that are capable of generic translation versus content items that require localized translation are described in U.S. patent application Ser. No. 12/891,266 entitled "LANGUAGE LOCALIZATION FOR NETWORK SITES," which was filed on Sep. 27, 2010 and is incorporated herein by reference in its entirety. The localization engine 124 may also access the data store 117 to determine whether previous pricing data 151 furnished by the merchant client 106 is already available.

The network page server 127 is executed to serve up localized offer listings to the customer clients 116 and operates in conjunction with the electronic commerce system 129 to perform purchase transactions. The localized offer listings may include such offer listing source data as hypertext markup language (HTML), extensible markup language (XML), extensible HTML (XHTML), mathematical markup language (MathML), scalable vector graphics (SVG), cascading style sheets (CSS), images, audio, video, graphics, text, and/or any other data that may be used in serving up or generating the offer listings. In some embodiments, the offer listing source data may be distributed across multiple data stores. The network page server 127 may comprise a commercially available hypertext transfer protocol (HTTP) server such as, for example, Apache® HTTP Server, Apache® Tomcat®, Microsoft® Internet Information Services (IIS), and so on.

The merchant client 106 is representative of a plurality of client devices that may be coupled to the network 109. The merchant client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The merchant client 106 may include a display device 157. The display device 157 may comprise, for example, one or more devices such as cathode ray tubes (CRTs), liquid crystal display (LCD) screens, gas plasma-based flat panel displays, LCD projectors, or other types of display devices, etc.

The merchant client 106 may be configured to execute various applications such as a browser 160 and/or other applications. The browser 160 may be executed in a merchant client 106, for example, to access and render offer listings, such as web pages, or other network content served up by the computing device 103 and/or other servers, thereby generating a rendered offer listing in the form of a network page 163 on the display device 157.

Similarly, the customer client 116 used by customers to access localized offer listings may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The customer client 116 may include a display device 177. The display device 177 may comprise, for example, one or more devices such as cathode ray tubes (CRTs), liquid crystal display (LCD) screens, gas plasma-based flat panel displays, LCD projectors, or other types of display devices, etc.

The customer client 116 may be configured to execute various applications such as a browser 170 and/or other applications. The browser 170 may be executed in a customer client 116, for example, to access and render offer listings, such as web pages, or other network content served up by the computing device 103 and/or other servers, thereby generating a rendered offer listing in the form of a network page 173 on the display device 177.

Figure 2:
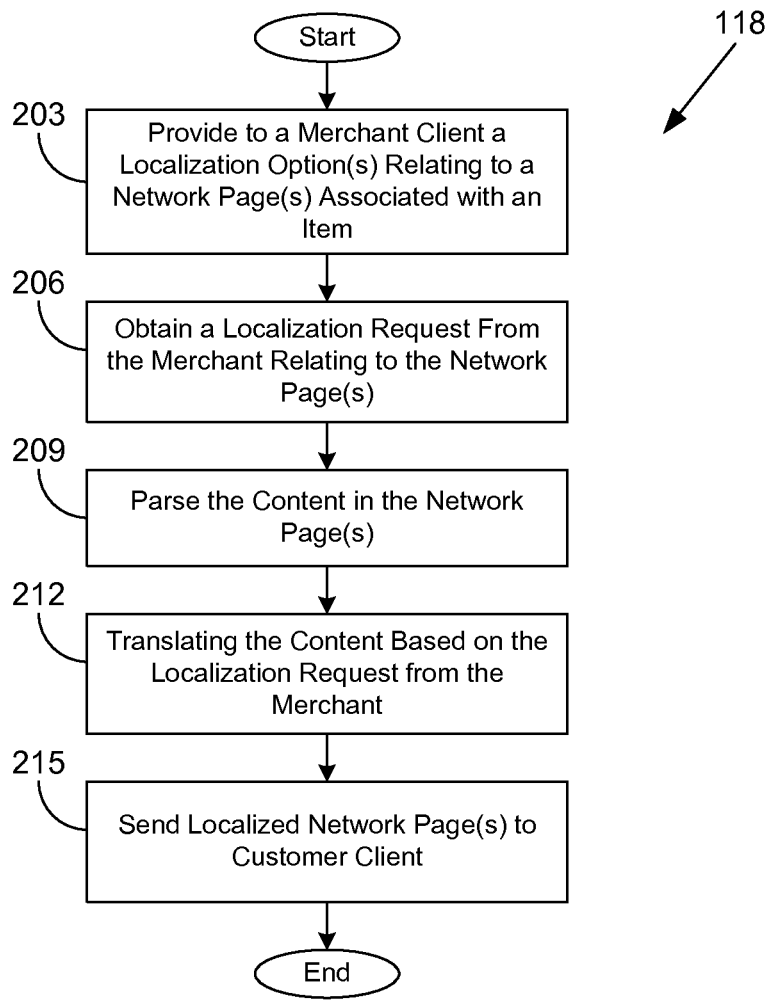
FIGS. 2-4 are flowcharts illustrating examples of functionality implemented as portions of a localization application executed in a computing device in the networked environment of FIG. 1 according to various embodiments of the present disclosure.

Referring next to FIG. 2, shown is a flowchart that provides one example of the operation of a portion of the localization application 118 according to various embodiments. It is understood that the flowchart of FIG. 2 provides merely an example of the many different types of functional arrangements that may be employed to implement the operation of the portion of the localization application 118 as described herein. As an alternative, the flowchart of FIG. 2 may be viewed as depicting an example of steps of a method implemented in the computing device 103 (FIG. 1) according to one or more embodiments. The flowchart of FIG. 2 depicts the high level operation of the localization process executed by the localization application 118.

Beginning with box 203, the merchant interface application 121 (FIG. 1) provides to a merchant one or more localization options relating to an offer listing(s) to be localized where the offer listing(s) is associated with an item to be purchased by a customer in a particular locale. Note that the one or more localization options the localization option may be provided based at least in part on one or more determined locations of inventory associated with the merchant. In some embodiments, the localization option may be provided based at least in part on electronic marketplaces of interest to the merchant, registered marketplaces associated with the merchant, or fulfillment capabilities of the merchant. The offer listing(s) to be localized may be specified by the merchant client 106 (FIG. 1).

The merchant interface application 121 may retrieve a selection from the merchant client 106 through a user interface. The user interface displays one or more locales for which the offer listing specified by the merchant client 106 may be localized. In some embodiments, the merchant interface application 121 may display a list of languages rather than a list of locales that the merchant client 106 may select from.

As described above, the merchant interface application 121 may provide a list of locales that the merchant can select from for localizing content. For some embodiments, the list of locales or list of languages may be generated based at least in part on the geographical area(s) serviced by a material handling facility such as a fulfillment center or other facility operated by the merchant such that inventory described in a purchase order may be readily shipped to the fulfillment center and later sent to the customer. In this regard, the merchant interface application 121 may have access to a listing of the locales in which one or more fulfillment centers of the merchant are located.

In box 206, the merchant interface application 121 obtains a localization selection 144 (FIG. 1) from the merchant relating to the offer listing(s) to be localized, where the localization selection 144 may include one or more selections from the list of locales/languages provided by the merchant interface application 121 via the user interface described above. The merchant interface application 121 may also obtain item information 147 (FIG. 1) from the merchant client 106, where the item information 147 includes pricing information associated with the selected locale(s), reclassification information, the cost of shipping between a given fulfillment center and a given customer, and so on. The item information 147 may be, for example, in the form of HTML, XML, XHTML, MathML, SVG, images, text, and/or other types of content.

In box 209, the localization engine 124 (FIG. 1) parses content contained in the offer listing(s) specified by the merchant client 106 to undergo localization. For some embodiments, the localization engine 124 is configured to parse the content to identify content items capable of generic translation versus content items that may require localized translation. For content items capable of generic translation, the localization engine 124 accesses the data store 117 (FIG. 1) to search localization data 145 (FIG. 1) generated as a result of past localization performed on other content. As described above, localization data 145 may include translation data 148 (FIG. 1) associated with generic terms. As a non-limiting example, the translation data 148 may include such phrases as "digital camera" and "ebook reader" available in five languages.

Content items, determined by the localization engine 124, without generic translation equivalents may be routed to another portion of code executing within the same computing device 103 executing the localization engine 124. However, the content items without generic translation equivalents may also be routed to another computing device 103. For some embodiments, one or more computing devices 103 may be configured to provide such content items to translation professionals, where the translation professionals process any remaining portions of the content to generate a translated version. The localization engine 124 may be configured to receive the content processed by the translation professionals. The localization engine 124 may be further configured to search pricing data 151 (FIG. 1) in the data store 117 to determine whether previous pricing information is available for the item(s) selected by the merchant client 106. If previous pricing information is available, such pricing may be displayed to the merchant client 106 as a suggested price. Ultimately, the merchant client 106 specifies the pricing of the item to be displayed to customers associated with the selected locale(s).

In box 212, the localization engine 124 performs a translation of the content based at least in part on the localization request received from the merchant client 106, where the location request may include a localization selection 144 and item information 147. In box 215, the network page server 127 serves up the localized offer listing(s) to one or more customer client 116 (FIG. 1), which customers may then utilize to conduct transactions using the localized content. The network page server 127 may send the localized offer listing(s) through the use of HTTP and/or other communications protocols. Thereafter, the portion of the localization application 118 ends.

Figure 3:
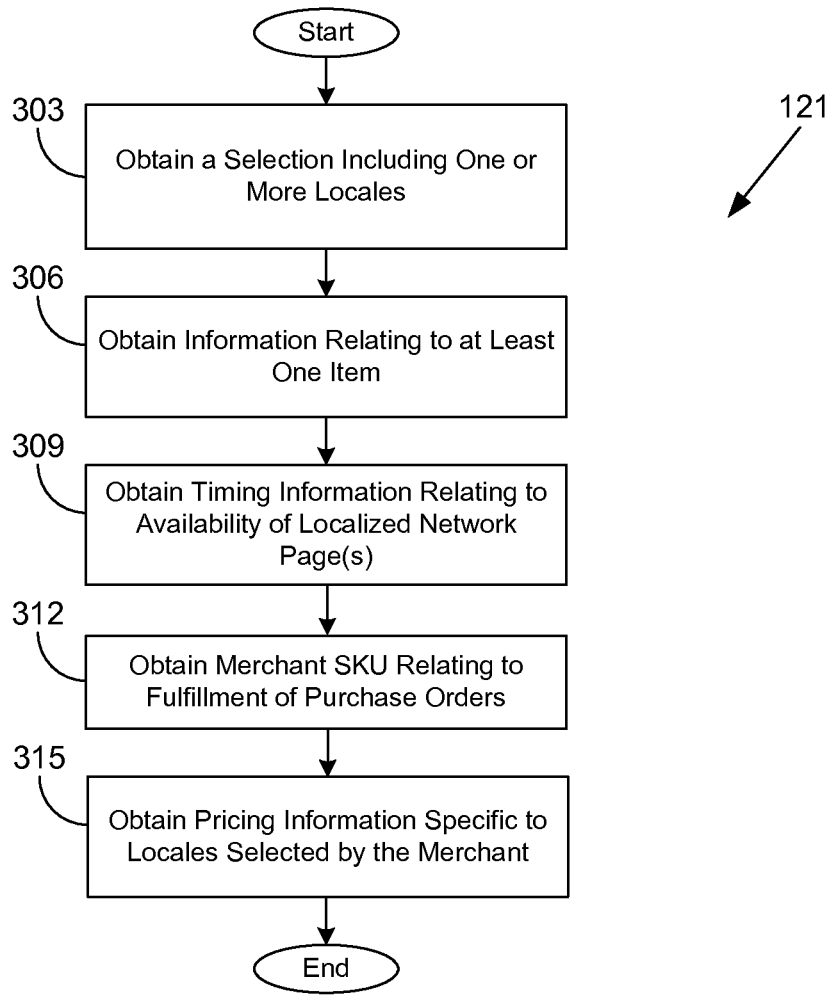

Referring next to FIG. 3, shown is a flowchart that provides one example of the operation of a portion of the merchant interface application 121 according to various embodiments. It is understood that the flowchart of FIG. 3 provides merely an example of the many different types of functional arrangements that may be employed to implement the operation of the portion of the merchant interface application 121 as described herein. As an alternative, the flowchart of FIG. 3 may be viewed as depicting an example of steps of a method implemented in the computing device 103 (FIG. 1) according to one or more embodiments. The merchant interface application 121 is executed in the computing device 103 and interfaces with the merchant client 106 (FIG. 1) over the network 109 (FIG. 1).

Beginning with box 303, the merchant interface application 121 obtains a localization selection 144 (FIG. 1) from the merchant client 106 (FIG. 1) relating to one or more locales for performing localization. As described above, the list of locales from which the localization selection 144 is selected may be generated based at least in part on the geographical area(s) serviced by a material handling facility such as a fulfillment center or other facility operated by the merchant such that inventory described by a purchase order may be readily shipped to the fulfillment center and later sent to the customer such that shipping costs to customers are minimized.

In box 306, the merchant interface application 121 obtains item information 147 (FIG. 1) from the merchant client 106 relating to at least one item. The item information 147 may include a description of the item, shipping information relating to the item, and so on. In box 309, the merchant interface application 121 obtains timing information relating to when the localized offer listing(s) is to be made available for customers to view and conduct purchase transactions. That is, the timing information may specify when the localized offer listing(s) is to go live and begin processing purchase requests.

In box 312, the merchant interface application 121 obtains a merchant SKU from the merchant client 106 relating to fulfillment of purchase orders, where the merchant SKU specifies specific inventory for fulfilling purchase orders. By specifying a merchant SKU, a merchant is able to control which inventory at a particular location is accessed for fulfilling purchase orders. In box 315, the merchant interface application 121 obtains pricing information from the merchant client 106 specific to the locales selected by the merchant. While suggested pricing may be provided to the merchant client 106, the final listed price used for a localized item listing(s) is generally finalized by the merchant client 106. Thereafter, the portion of the merchant interface application 121 ends.

Figure 4:
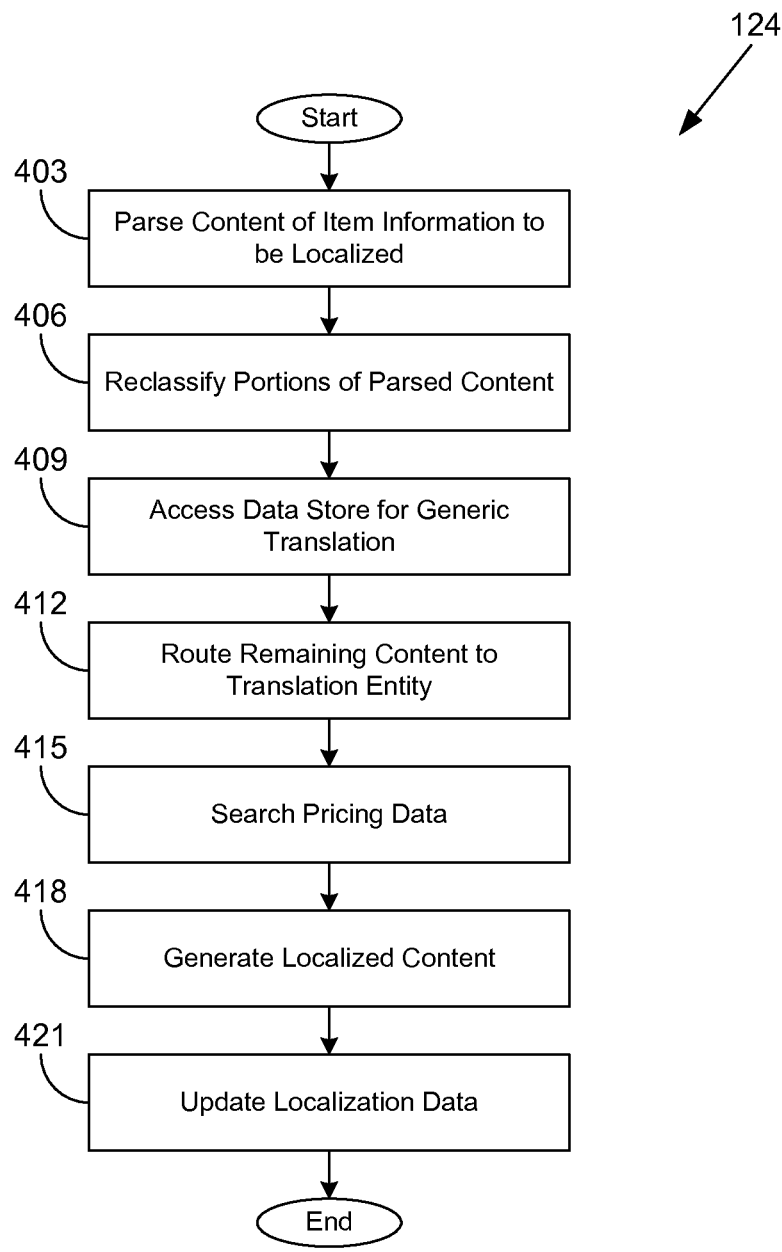

Referring next to FIG. 4, shown is a flowchart that provides one example of the operation of a portion of the localization engine 124 according to various embodiments. It is understood that the flowchart of FIG. 4 provides merely an example of the many different types of functional arrangements that may be employed to implement the operation of the portion of the localization engine 124 as described herein. As an alternative, the flowchart of FIG. 4 may be viewed as depicting an example of steps of a method implemented in the computing device 103 (FIG. 1) according to one or more embodiments.

Beginning in box 403, the localization engine 124 parses the content contained in the item information obtained from the merchant client 106 (FIG. 1) according to generic translation blocks. In box 406, upon parsing the content, the localization engine 124 reclassifies portions of the parsed content. In box 409, the localization engine 124 accesses the data store 117 (FIG. 1) to determine whether translation data 148 (FIG. 1) relating to the content or a portion of the content is already available so that translation of that portion may be bypassed. To this end, the localization engine 124 is configured to parse the content to identify content items capable of generic translation versus content items that may require localized translation.

In box 412, content items determined by the localization engine 124 not to be capable of generic translation may be routed to another translation entity such as, for example, translation professionals, who process any remaining portions of the content to generate a translated version. In box 415, the localization engine 124 may be further configured to search pricing data 151 in the data store 117 to determine whether previous pricing information relating to the merchant client 106 is available for the item(s) selected by the merchant client 106. In box 418, localized content is generated by the localization engine 124. Note that for some embodiments, the localization engine 124 may also be configured to adjust pricing of items in foreign marketplaces to account for fluctuations in currency exchange rates as a merchant may have a specific return in mind when listing an item for sale in a foreign electronic marketplace. In box 421, the localization engine 124 may be configured to track and index the newly generated location data for future access so that only portions of newly specified content must be translated while the rest is retrieved from the data store 117 (FIG. 1). Thereafter the portion of the localization engine 124 ends.

Figure 5:
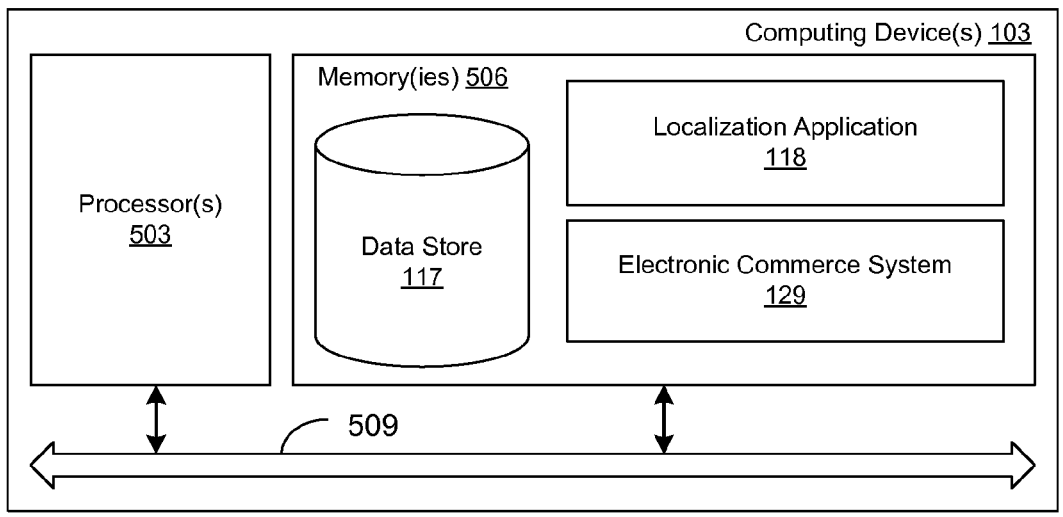
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the localization application 118 and the electronic commerce system 129, and potentially other applications. Also stored in the memory 506 may be a data store 117 and other data. In addition, an operating system may be stored in the memory 506 and executable by the processor 503.

Figure 6:
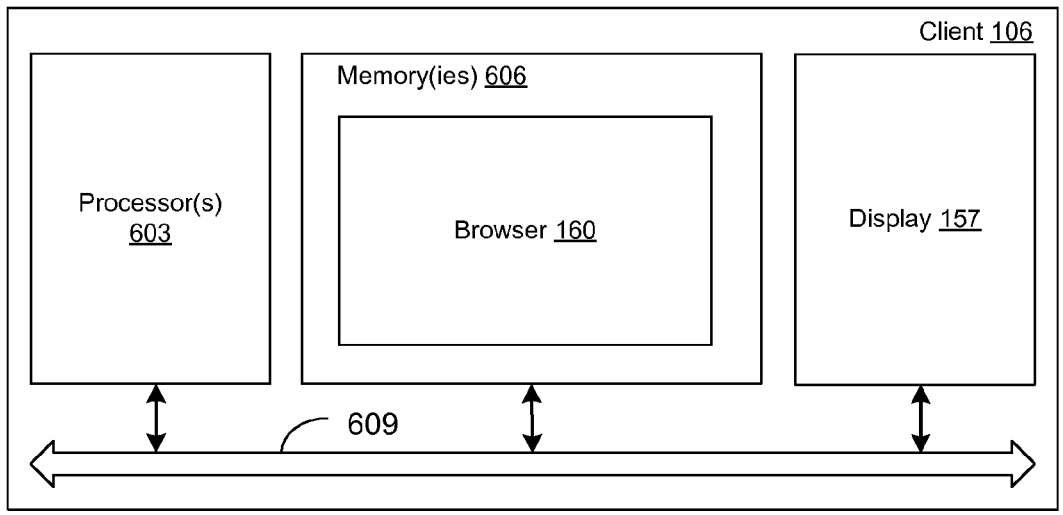
FIG. 6 is a schematic block diagram that provides one example illustration of a merchant client employed in the networked environment of FIG. 1 according to various embodiments of the present disclosure.

Referring next to FIG. 6, shown is a schematic block diagram of the merchant client 106 according to an embodiment of the present disclosure. The merchant client 106 includes at least one processor circuit, for example, having a processor 603 and a memory 606, and a display device 157, which are all coupled to a local interface 609. The local interface 609 may comprise, for example, a data bus with an accompanying address/control bus or other bus structure as can be appreciated. The merchant client 106 may also include various peripheral devices coupled to the local interface 609. In particular, peripheral devices may include input devices, for example, a keyboard, keypad, touch pad, touch screen, microphone, scanner, mouse, joystick, or one or more push buttons, etc. The peripheral devices may also include indicator lights, speakers, printers, etc.

Stored in the memory 606 are both data and several components that are executable by the processor 603. In particular, stored in the memory 606 and executable by the processor 603 are the browser 160 and potentially other applications. In addition, an operating system may be stored in the memory 606 and executable by the processor 603.

Referring now to both FIGS. 5 and 6, it is understood that there may be other applications that are stored in the memories 506, 606 and are executable by the processors 503, 603 as can be appreciated. Where any component discussed herein is implemented in the form of software, any one of a number of programming languages may be employed such as, for example, C, C++, C#, Objective C, Java, JavaScript, VBScript, Perl, PHP, Visual Basic, Python, Ruby, Delphi, Flash, Shockwave, or other programming languages.

A number of software components are stored in the memories 506, 606 and are executable by the respective processors 503, 603. In this respect, the term "executable" means a program file that is in a form that can ultimately be run by the processors 603, 703. Examples of executable programs may be, for example, a compiled program that can be translated into machine code in a format that can be loaded into a random access portion of the memories 506, 606 and run by the respective processors 503, 603, source code that may be expressed in proper format such as object code that is capable of being loaded into a random access portion of the memories 506, 606 and executed by the respective processors 503, 603, or source code that may be interpreted by another executable program to generate instructions in a random access portion of the memories 506, 606 to be executed by the respective processors 503, 603, etc. An executable program may be stored in any portion or component of the memories 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 506, 606 are defined herein as including both volatile and nonvolatile memory and data storage components. Volatile components are those that do not retain data values upon loss of power. Nonvolatile components are those that retain data upon a loss of power. Thus, the memories 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 503, 603 may represent multiple processors 503, 603 and each memory 506, 606 may represent multiple memories 506, 606 that operate in parallel processing circuits, respectively. In such a case, the respective local interface 509, 609 may be an appropriate network 109 (FIG. 1) that facilitates communication between any two of the multiple processors 503, 603, between any processor 503, 603 and any of the respective memories 506, 606, or between any two of the respective memories 506, 606, etc. The local interfaces 509, 609 may comprise additional systems designed to coordinate this communication, including, for example, performing load balancing. The processors 503, 603 may be of electrical or of some other available construction.

Although the localization application 118, the electronic commerce system 129, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the localization application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the localization application 118 and the electronic commerce system 129, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in a computing device, the at least one program comprising:
   code that generates a first network page including a first user interface that includes a localization option for selection by a merchant relating to at least one offer listing of the merchant to be localized, wherein the localization option is based at least in part on stored data which includes a location of a fulfillment center of the merchant with respect to at least one target locale of the merchant;
   code that sends the first network page including the first user interface over a network to a merchant client device for rendering on a display of the merchant client device;
   code that obtains a localization request via the first user interface of the first network page rendered on the merchant client device, wherein the localization request includes a language selection corresponding to the localization option, the language selection being for localization of the at least one offer listing;
   code that parses current content contained in the at least one offer listing;
   code that retrieves, based at least in part on the localization request, translated content from the stored data in response to a translation being available for at least a portion of the current content that has been parsed;
   code that translates the current content by replacing the current content with the translated content to generate at least one localized offer listing based at least in part on the localization request; and
   code that, in response to a query from a customer client device, sends a second network page including a second user interface including the at least one localized offer listing to the customer client device, the second user interface being different from the first user interface.

2. The non-transitory computer-readable medium of claim 1, wherein the localization request further includes item information, pricing information, and timing information.

3. The non-transitory computer-readable medium of claim 2, wherein the timing information relates to availability of the localized offer listing to customers associated with the language selection.

4. A method, comprising:
   generating, by at least one computing device, a first network page including a first user interface comprising at least one localization option associated with at least one current offer listing by a merchant of at least one item in a current electronic marketplace that is associated with at least one current locale, wherein the at least one current offer listing is stored in stored data and the at least one localization option allows the merchant to be associated with at least one localized offer listing of the at least one item in a different electronic marketplace that is associated with at least one different locale that relates to at least a language and a geographical area;
   providing over a network, by the at least one computing device, the first network page including the first user interface to a merchant client device for rendering on the merchant client device;
   obtaining, by the at least one computing device, a localization request from the merchant client device via the first user interface of the first network page, the localization request associated with the at least one localization option and relating to the at least one localized offer listing;
   based at least in part on the localization request, translating, by the at least one computing device, content to generate the at least one localized offer listing having localized content, the at least one localized offer listing being associated with the different electronic marketplace associated with the at least one different locale; and
   sending, by the at least one computing device, a second network page including a second user interface including the at least one localized offer listing to a customer client device, the second user interface being different from the first user interface.

5. The method of claim 4, wherein the localization request is provided by the merchant at least in part in feed format.

6. The method of claim 4, further comprising determining the at least one localization option based at least in part on at least one inventory location of the merchant.

7. The method of claim 4, further comprising determining the at least one localization option based at least in part on fulfillment capabilities of the merchant.

8. The method of claim 4, wherein obtaining the localization request comprises:
   obtaining, by the at least one computing device, information relating to the at least one item;
   obtaining, by the at least one computing device, a selection relating to at least one locale; and obtaining, by the at least one computing device, pricing information relating to the at least one item.

9. The method of claim 8, wherein obtaining the localization request further comprises:

obtaining, by the at least one computing device, timing information relating to availability of the at least one localized offer listing; and making available, by the at least one computing device, the at least one localized offer listing.

10. The method of claim 8, wherein the at least one localization option comprises the language associated with the at least one different locale, wherein the language is utilized for translation of the content contained in the at least one current offer listing.

11. The method of claim 8, wherein the at least one localization option comprises a marketplace locale selected from a list of inventory locations of the merchant.

12. The method of claim 8, wherein obtaining the localization request further comprises obtaining, by the at least one computing device, at least one merchant identifier relating to inventory.

13. The method of claim 4, wherein translating the content to generate the at least one localized offer listing comprises parsing, by the at least one computing device, the content contained in the at least one current offer listing.

14. The method of claim 13, wherein translating the content to generate the at least one localized offer listing comprises:

determining, by the at least one computing device, whether a prior translation is available in the stored data for at least one parsed portion of the content contained in the at least one current offer listing; and responsive to the prior translation being available, retrieving, from the stored data by the at least one computing device, the prior translation for the at least one parsed portion of the content.

15. The method of claim 4, further comprising storing at least a portion of the at least one localized offer listing for future access in the stored data.

16. A system, comprising:

at least one computing device comprising stored data; and a localization application executable in the at least one computing device, the localization application comprising:

logic that provides a first network page including a first user interface over a network to a merchant client device, the first user interface including at least one localization option relating to at least one offer listing of a merchant in the stored data to be localized;

logic that obtains a localization request via the first user interface of the first network page rendered on the merchant client device, the localization request relating to the at least one offer listing and including at least one language for translating content in the at least one offer listing;

logic that localizes the content to generate at least one localized offer listing based at least in part on the localization request; and logic that, in response to a query via a customer client device, provides localized content to the customer client device via a second network page including a second user interface, the localized content corresponding to the at least one localized offer listing.

17. The system of claim 16, wherein logic that provides the at least one localization option is configured to determine the at least one localization option based at least in part on fulfillment capabilities of the merchant.

18. The system of claim 16, wherein the logic that localizes the content is further configured to archive at least a portion of the localized content for future access in the stored data.

19. The system of claim 16, wherein the localization request comprises at least one locale selection, pricing information, and a merchant identifier associated with an inventory of the merchant.

20. The system of claim 16, wherein the localization request further comprises timing information relating to availability of the at least one localized offer listing with respect to customers.

21. The system of claim 16, wherein the logic that localizes the content is further configured to:

parse the content contained in the at least one offer listing; and translate the content that has been parsed to generate the at least one localized offer listing.

\* \* \* \* \*